(12) United States Patent
Yang et al.

(10) Patent No.: US 8,784,065 B2
(45) Date of Patent: Jul. 22, 2014

(54) FRICTION WELDING OF TITANIUM ALUMINIDE TURBINE TO TITANIUM ALLOY SHAFT

(75) Inventors: Nan Yang, Dunlap, IL (US); Jeff A. Jensen, Dunlap, IL (US); Jesus G. Chapa Cabrera, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 573 days.

(21) Appl. No.: 13/114,177

(22) Filed: May 24, 2011

(65) Prior Publication Data
US 2012/0301307 A1 Nov. 29, 2012

(51) Int. Cl.
*F01D 5/02* (2006.01)

(52) U.S. Cl.
USPC ................ 416/213 R; 416/241 R; 228/114.5; 148/527

(58) Field of Classification Search
CPC .......................... B23K 2201/001; B23K 20/12
USPC ......... 416/213 R, 241 R; 148/527; 228/114.5
See application file for complete search history.

(56) References Cited

U.S. PATENT DOCUMENTS

| | | | |
|---|---|---|---|
| 5,431,752 A * | 7/1995 | Brogle et al. | ................. 148/516 |
| 6,691,910 B2 | 2/2004 | Hirose et al. | |
| 6,848,180 B2 * | 2/2005 | Shimizu | ....................... 29/889.2 |
| 7,156,282 B1 * | 1/2007 | Renaud et al. | ............. 228/122.1 |
| 2006/0067824 A1 | 3/2006 | O'Hara | |
| 2008/0000558 A1 | 1/2008 | Yang et al. | |
| 2010/0040473 A1 | 2/2010 | Renett | |
| 2011/0091324 A1 * | 4/2011 | Holzschuh | ................ 416/200 A |

FOREIGN PATENT DOCUMENTS

| | | |
|---|---|---|
| DE | 2514699 | 10/1976 |
| EP | 438164 | 7/1991 |
| EP | 816007 | 1/2003 |
| JP | 1984061584 | 4/1984 |
| JP | 1987197610 | 9/1987 |
| JP | 19900160187 | 6/1990 |
| JP | 19900160188 | 6/1990 |
| JP | 1990173322 | 7/1990 |

* cited by examiner

*Primary Examiner* — Ninh H Nguyen
(74) *Attorney, Agent, or Firm* — Miller, Matthias & Hull

(57) ABSTRACT

A frictional welding process for joining a titanium aluminide turbine to a titanium alloy shaft is disclosed. The disclosed process includes preheating the turbine to a designated temperature, providing a specially-designed joining interface geometry at the distal end of the shaft and optimizing the frictional welding parameters. The frictional welding is carried out in multiple steps but, while the shaft is being spun by a rotating chuck, two different pressures and two different time periods are used until the narrower portions of the distal end of the shaft have been fused onto the welding surface of the turbine. Then, an additional forging step with yet another engagement pressure between the shaft and the turbine is carried out without rotation of the shaft.

20 Claims, 3 Drawing Sheets

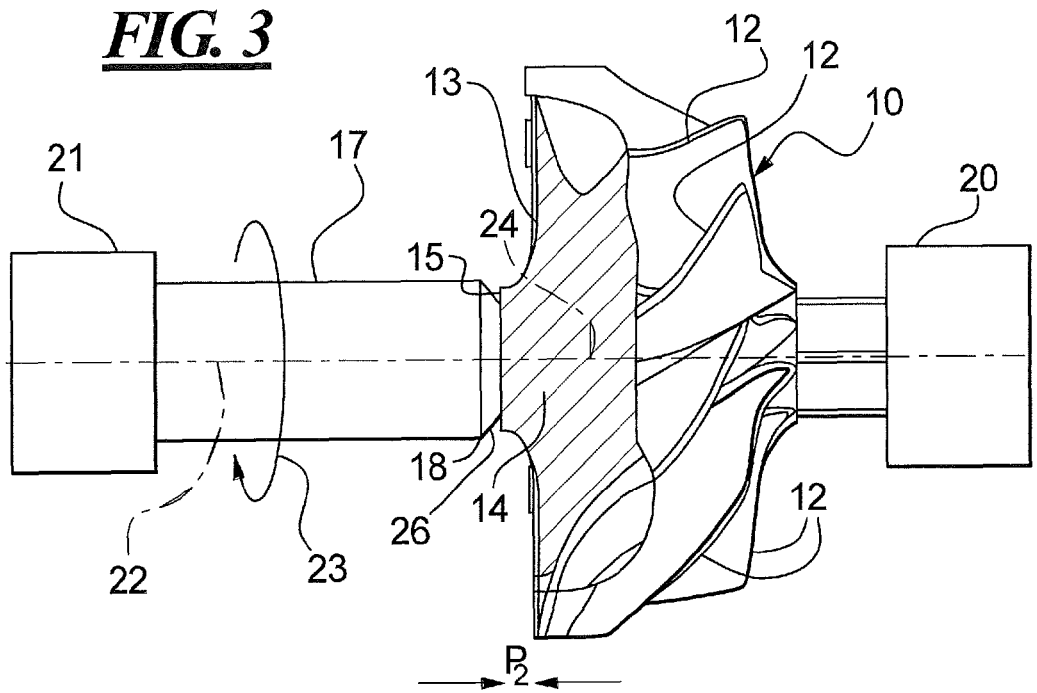
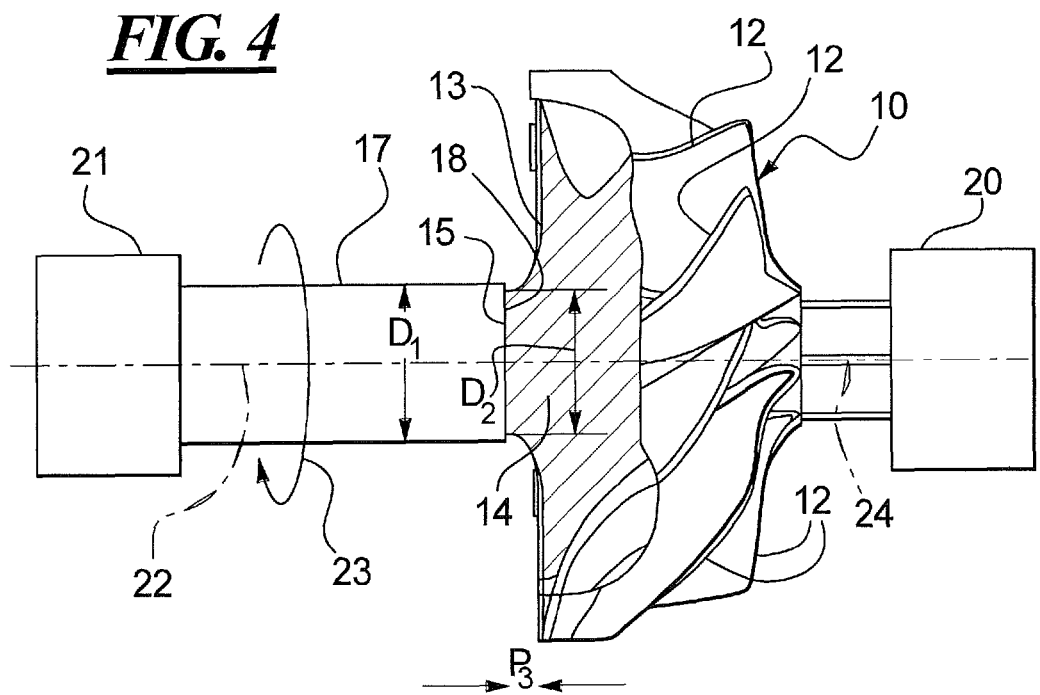



FRICTION WELDING OF TITANIUM ALUMINIDE TURBINE TO TITANIUM ALLOY SHAFT

TECHNICAL FIELD

This disclosure relates to turbochargers for engines, and more particularly, to turbochargers fabricated with titanium aluminide that are welded to shafts fabricated with titanium.

BACKGROUND

Turbochargers can increase the power of engines by providing additional air to the engine cylinders. An exhaust-gas driven turbine connected to a compressor may be used to produce the additional air. However, turbocharger lag, which occurs while turbocharger turbines develop adequate rotational speed, can be a problem. One method for reducing turbocharger lag is to decrease the weight of the turbocharger's rotating parts, including the turbine and the shaft attached to the turbine.

Titanium-aluminide constitutes a lightweight, strong material that may be used to produce turbocharger turbines. However, the use of titanium-aluminide can complicate joining of the turbine to the turbocharger shaft, which is often made with steel. Titanium-aluminide and steel have different thermal expansion properties and may produce undesirable phase transformations at their material interfaces. Therefore, because turbochargers experience significant temperature variations, a titanium-aluminide turbine and a steel shaft may be unsuitable for joining directly to one another.

One method of joining titanium-aluminide turbines to steel shafts is disclosed in U.S. Pat. No. 6,291,086. The method describes the use of an interlayer material disposed between a titanium-aluminide turbine and steel shaft. The interlayer material is welded to both the titanium-aluminide turbine and steel shaft. Therefore, although this method may provide a suitable connection between the turbine and shaft, two welds must be made and an additional material must be used, which can add significant time and cost to production. Further, use of a steel shaft adds significant weight to the turbocharger, which can increase turbocharger lag. Thus, turbocharger shafts fabricated from lighter materials such as titanium or titanium alloys are preferable as indicated in U.S. Patent Application Publication 2006/0067824, which discloses titanium aluminide turbine boned to a titanium shaft by various means such as gas tungsten-arc welding, gas metal-arc welding, resistance welding, laser welding, plasma arc welding, electron-beam welding, friction welding, brazing, and soldering.

However, bonding a turbine made from a titanium aluminide to a shaft made from a titanium alloy is challenging because of three reasons: high local thermal stress involved with bonding process; formation of brittle intermetallic phases at the bonding interface; and inherent low room temperature ductility of titanium aluminide alloys. Because of these reasons, the bonding interface between a titanium aluminide turbine and a titanium alloy shafts and even the titanium aluminide turbine itself are prone to crack during or after the bonding process.

In some applications, because of specific geometry or a large size of the titanium aluminide turbine, the local thermal stresses can become extremely high and therefore render the bonding process even more challenging. For example, in turbine rotor applications, the bonding interface is fairly close to rear face of the turbine, and the geometry of the turbine hub changes rapidly. This rapid change in geometry, in addition to the large thermal mass of turbine wheel, may cause a steep temperature gradient, and therefore, may cause large thermal stress which may exceed the strength of the titanium aluminide in the vicinity of the bonding interface with the titanium alloy shaft.

One method of bonding a titanium aluminide component to a titanium alloy component involves the use of friction welding as disclosed in US2008/0000558. The titanium aluminide component is heated to a temperature between 300° C. and 800° C. The titanium alloy component is rotated relative to the titanium aluminide component. The titanium aluminide and titanium alloy components are pressed against each other while the titanium alloy component is rotated. The rotation is then stopped, and the two components are pressed against each other again as a forging step after the rotation is stopped.

However, despite these recent advances, the joint between a titanium aluminide turbine and a titanium alloy shaft may crack during or after the joining process. The friction welding process imposes substantial thermal stresses. Because titanium aluminide and other intermetallic phases formed at the welding interface have a limited ductility, such components or joints can be prone to crack under stress. Further, the stresses are often increased because of the geometry of the turbine and shaft and the size of the two components. Thus, the joining of a titanium aluminide turbine to a titanium alloy shaft is very challenging.

SUMMARY OF THE DISCLOSURE

In satisfaction of the aforenoted needs, a friction welding method is disclosed for joining a first component fabricated from titanium aluminide to a second component fabricated from a titanium alloy. The disclosed method includes preheating the first component made from titanium aluminide, rotating the second component and pressing the second component against the first component at a first pressure for a first time period. After the first time period expires, the method also includes rotating the second component and pressing the second component against the first component at a second pressure for a second time period. After the second time period expires, the method further includes stopping the rotation of the second component and pressing the second component against the first component at a third pressure for a third time period as a forging step.

In another aspect, a method of joining a shaft to a turbine of a turbo charger is disclosed. The method includes providing a titanium alloy shaft having an end having a first diameter and that is connected to a distal end having a second diameter that is smaller than the first diameter. The smaller distal end extends distally from the larger end of the shaft. The method also includes providing a titanium aluminide turbine with a welding surface for receiving the end of the shaft and having a third diameter greater than the second diameter. The method also includes preheating the turbine and placing the shaft into rotating chuck and placing the turbine in a stationary chuck that is axially aligned with the rotating chuck so that the shaft is in axial alignment with the welding surface of the turbine. The method then includes rotating the shaft and pressing the distal end of the shaft against the welding surface of the turbine for a first time period and at a first engagement pressure. After the distal end of the shaft has been substantially displaced or fused into the welding surface of the turbine, the method further includes continuing to rotate the shaft and pressing the end of the shaft against the welding surface of the turbine for a second time period and at a second engagement pressure. After the second time period has ended, the method further includes stopping rotation of the shaft and continuing to press the end of the shaft against the welding surface of the turbine for a third time period and at a third engagement pressure as a forging step.

BRIEF DESCRIPTION OF THE DRAWINGS

FIG. 3 is yet another side and partial sectional view as the shaft is being frictionally welded to the turbine.

FIG. 4 is yet another side and partial sectional view of a shaft and turbine during the final forging step of the disclosed frictional welding process.

DETAILED DESCRIPTION

Figure 1:
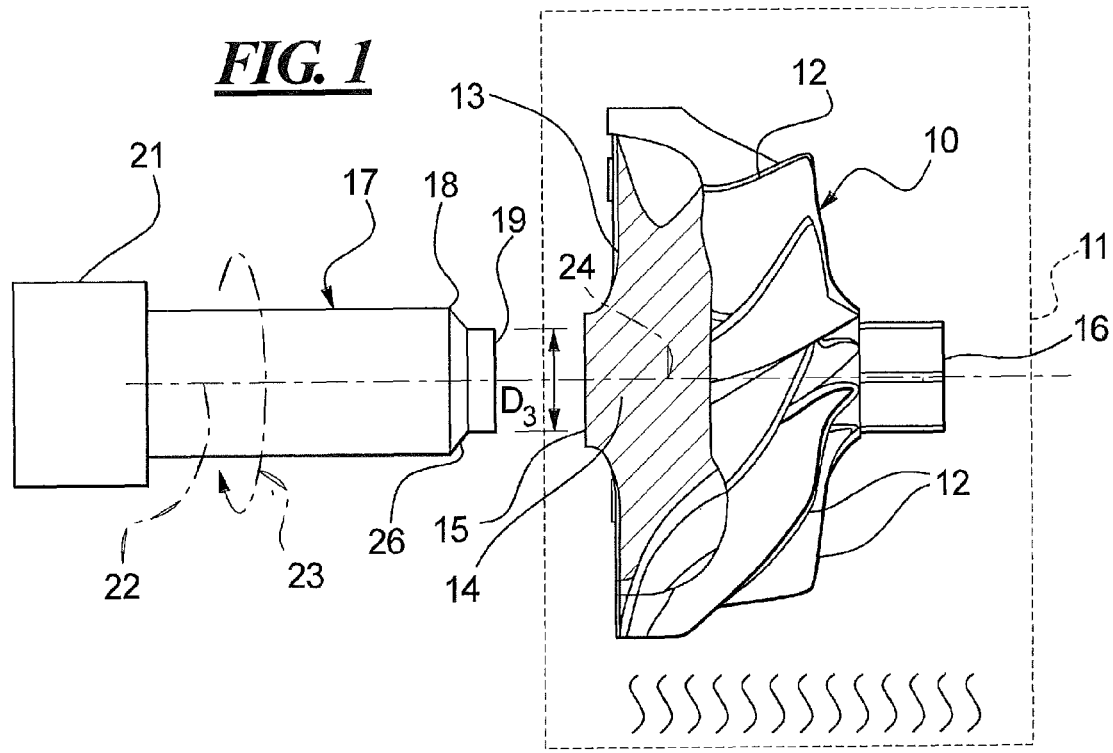
FIG. 1 is a partial side and cross sectional view of a turbine and shaft prior to the connection of the shaft to the turbine.

Referring to FIG. 1, a turbocharger turbine 10 is shown inside a heating apparatus 11 which may be used to preheat the turbine 10 prior to conducting the remaining steps of the disclosed frictional welding process. The turbine 10 may include a plurality of vanes 12 connected to a turbine rotor wheel 13. The rotor wheel 13 may include a hub portion 14 that features an end surface or welding surface 15. The turbine 10 may also include a distal extension 16 which may be used to hold the turbine 10 in place in the stationary chuck 17 shown schematically in FIG. 2.

Figure 2:
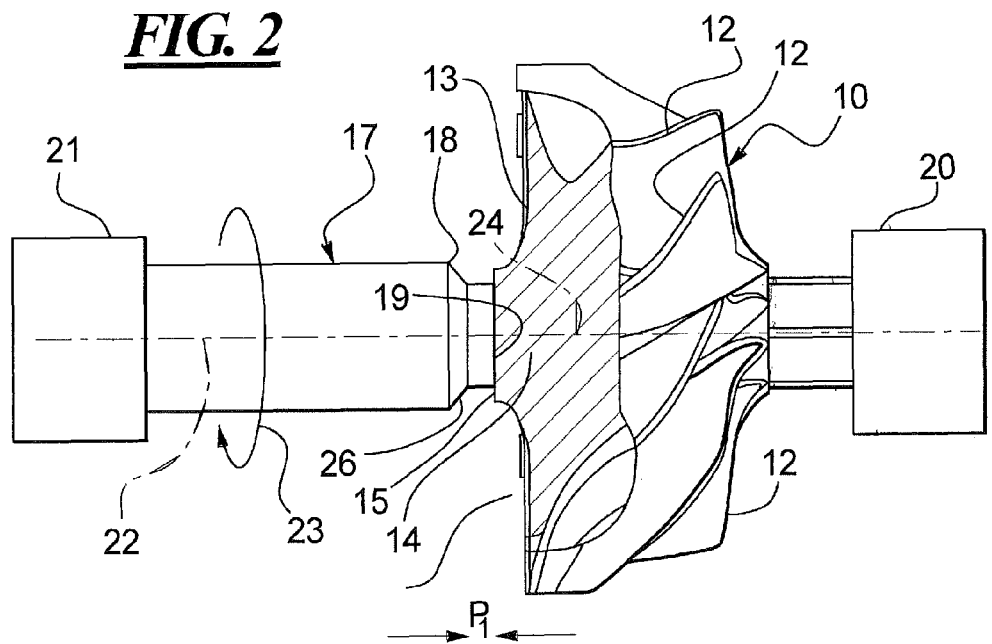
FIG. 2 is another side and partial sectional view of the shaft and turbine as the shaft is being frictionally welded to the turbine.
Figure 5:
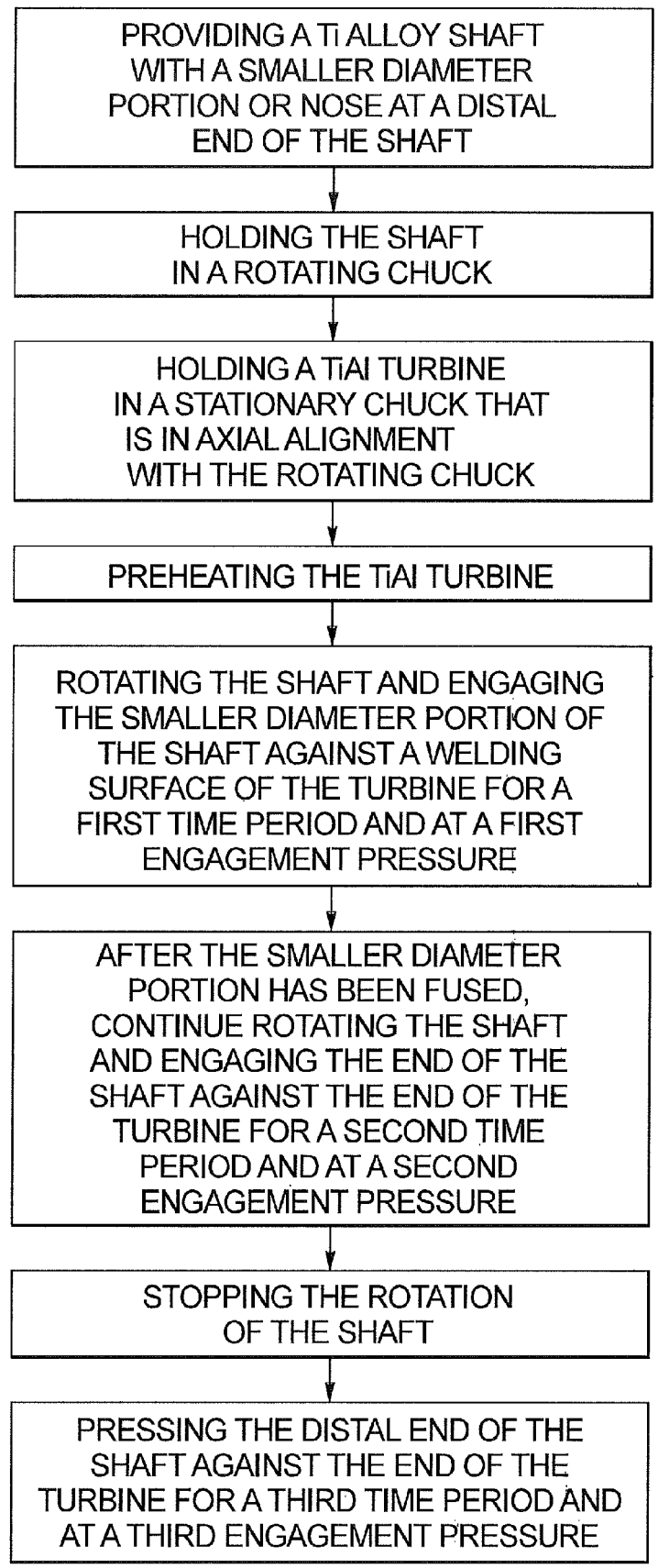
FIG. 5 is a flow diagram illustrating a disclosed frictional welding process.

Returning to FIG. 1, the shaft 17 may include an end 18 that is connected to a further distal end 19 by a beveled portion 26. The smaller distal end 19 engages the turbine 10 first during the frictional welding process as illustrated in FIG. 2. Still referring to FIG. 1, the shaft 17 may be held in a rotating chuck 21 that can rotate the shaft 17 about its axis 22 as indicated by the arrow 23. The axis 22 of the shaft 17 is in alignment with the axis 24 of the turbine 10.

The turbine 10 may be preheated to a temperature ranging from about 300° C. to about 700° C., more preferably from about 400° C. to about 600° C. and still more preferably about 500° C. Before, after or during preheating, the turbine 10 can be mounted to the stationary chuck 21 as illustrated in FIG. 2. Rotation of the shaft 17 begins and the shaft 17 may be pressed against the welding surface 15 of the turbine 10 as illustrated in FIG. 2. More specifically, the distal end 19, which has a smaller diameter than the shaft 17 and a smaller diameter than the welding surface 15, may be pressed against the welding surface 15 as the rotating chuck 21 rotates the shaft 17 for a predetermined time period $t_1$ and with an engagement pressure $P_1$ between the distal end 19 and the welding surface 15.

Returning to FIG. 3, after the shaft 17 has been rotated against the turbine 10 for the first predetermined time period $t_1$ and that the first predetermined engagement pressure $P_1$, the distal end 19 of the shaft 17 has become at least partially fused into the welding surface 15 of the turbine 10 in combination with some outward radial displacement of the distal end 19 on the welding surface 15. At this stage, the rotating chuck 21 continues to spin the shaft 17 but at a different pressure $P_2$ for a second predetermined time period $t_2$. Generally, as the size of a component increases, the engagement pressure should increase. Therefore, $P_2$, which is applied after the distal end 19 has been removed (compare FIGS. 2 and 3), may be greater than $P_1$. However, the first time period $t_1$ may be longer than the second time period $t_2$ due to the need for the generation of heat during the first time period $t_1$.

Returning to FIG. 4, after the second time period $t_2$ has passed, the combination of the engagement pressure $P_2$, the heat generated by the engagement between the end 18 of the shaft 17 and the welding surface 15 causes the beveled portion 26 of the shaft 17 to be at least partially fused into the welding surface 15 of the turbine 10 as shown by a comparison of FIGS. 3 and 4.

Returning to FIG. 4, the distal end 19 and the beveled portion 26 had been fused on to the welding surface 15 of the turbine 10. FIG. 4 also illustrates that the diameter $D_1$ of the shaft 17 may be about the same or slightly greater than the diameter $D_2$ of the welding surface 15. It will also be noted that the diameters $D_1$ and $D_2$ (FIG. 4) are both larger than the diameter $D_3$ (FIG. 1) of the distal end portion 19 of the shaft 17 as illustrated in FIG. 1.

FIG. 4 illustrates a forging step of the disclosed frictional welding process. The rotating chuck 21 is stopped and rotation of the shaft 17 is discontinued. However, an engagement pressure $P_3$ may be applied between the end 18 of the shaft 17 and the welding surface 15 of the turbine 10. The engagement pressure $P_3$ for the forging step may be greater than the pressure $P_2$ used to weld the beveled portion 26 and end 18 of the shaft 17 to the welding surface 15 of the turbine 10 and greater than the pressure $P_1$ used to weld the distal end portion 19 of the shaft 17 to the welding surface 15 of the turbine 10.

Thus, in general, the second engagement pressure $P_2$ may be greater than the first engagement pressure $P_1$ because of the increase in size of the beveled portion 26 and end 18 of the shaft 17 as compared to the distal end portion 19. However, primarily because of increased heat that has been generated by the time the process reaches the step illustrated in FIG. 3, the second time period $t_2$ may be shorter than the first time period $t_1$. Because of the larger size or diameter of the end 18 of the shaft 17, the third pressure $P_3$ during the forging process may be greater than the first two engagement pressures $P_1$ and $P_2$. The forging step should not be rushed; it should be carried out for a third time period $t_3$ that may be longer than both the first and second time periods, $t_2$ and $t_1$.

In summary, the disclosed process may include preheating the turbine 10 to a designated temperature, providing an inner phase geometry that includes a welding surface 15, a shaft 17 with a smaller diameter distal end 19 or nose 19 and using a shaft diameter 17 that is similar in diameter to the welding surface 15. The welding parameters include using lower pressure $P_1$ for the first step, a higher pressure $P_2$ but a shorter time period $t_2$ for the second step and a higher pressure $P_3$ and a longer time period $t_3$ for the final forging step.

In previous designs, thermal stresses during the friction weld process were causing cracking. In particular, with a larger diameter and larger pressure, the temperature gradient between a point at the center of the shaft, which has zero velocity, and a point at the outer edge of the shaft, which has the highest velocity, was too much. By reducing the diameter at the distal end 19 of the shaft 17, the pressure $P_1$ can be reduced and the difference in velocity between the axial center of the shaft 17 or end 19 and the outer perimeter of the end 19 is reduced (i.e. smaller radius). Thus, the temperature gradient across the shaft 17 is reduced resulting in less thermal stress. Another benefit is that once the nose has been "ground away", the higher pressure $P_2$ time period $t_2$ can be shortened (versus the prior art approach) since the welding process is well underway in the first phase ($P_1$, $t_1$).

The preheating temperature for the turbine 10 can range from about 300° C. to about 700° C., more preferably from about 400° C. to about 600° C., still more preferably from about 500° C. The first engagement pressure $P_1$ can range from about 20 MPa or the lower limit of the machine to about 50 MPa, with one exemplary first engagement pressure being about 35 MPa. The first time period $t_1$ can range from about 6 to about 24 seconds, with one example being about 14 seconds. The second engagement pressure can range from about 50 MPa to about 150 MPa, with one exemplary second engagement pressure being about 100 Mpa. The second time period $t_2$ can range from about 1 seconds to about 7 seconds, with one exemplary time period being about 4 seconds. The third engagement (forging) pressure $P_3$ can range from about 150 MPa to about 500 MPa or the high limit of the machine, with one exemplary forging pressure being about 200 MPa. The forging time period $t_3$ can range from about 20 sec to about 5 minutes, with one exemplary forging time period being about 90 seconds.

Further, instead of time control, distance control or the shortening of the axial length of the shaft 17 (including the removal of the distal end 19) may be used during the friction stages of FIGS. 2 and 3. For example, the first distance, which may be about the axial length of the distal end 19, may range from about 3 mm to about 12 mm (instead of $t_1$), with one exemplary first distance being about 7.5 mm. The second distance, which may be about the axial length of the beveled portion 26 of the shaft 17, may range from about 2 mm to about 12 mm (instead of $t_2$), with one exemplary second distance being about 5.5 mm. These estimates, of course, are dependent on the size of the components.

INDUSTRIAL APPLICABILITY

In order to maximize the power generated by an internal combustion engine, the engine may be equipped with a turbocharger. A turbocharger includes a turbine 10 connected to a rotating shaft 17 that compresses air flowing into the engine to thereby forcing more air into a combustion chamber. The increase supply of air allows for increased fueling, which may result in increased power. A turbocharged engine typically produces more power than an engine without a turbocharger.

However, if the turbine 10 and shaft 17 are fabricated from heavy superalloy and steel, respectively, a phenomenon known as "turbocharger lag" may occur due to the increase torque required to get the shaft 17 and turbine 10 spinning properly. To alleviate this problem, the turbine may be fabricated from a lighter material such as titanium aluminide or various $Ti_3Al$ intermetallic compound-based alloys including, but not limited to Ti-45Al-2Nb-2Cr, Ti-47Al-2Nb-2Cr, Ti-47Al-2W-0.5Si, Ti-47Al-2Nb-1Mn-0.5W-0.5Mo-0.2Si, Ti-48Al-2Nb-0.7Cr-0.3Si, Ti-45Al-2Mn-2Nb-0.8 vol % TiB2 and Ti-47Al-2Mn-2Nb-0.8 vol % TiB2. Further, the shaft 17 may be fabricated from a titanium alloy including, but not limited to Ti-6Al-4V, Ti-6Al-6V-2Sn and Ti-6Al-2Sn-4Zr-6Mo. However, titanium aluminide intermetallic alloys are prone to crack during or after the bonding process because of high thermal stresses and low room temperature ductilities. This problem is compounded when a titanium aluminide turbine is joined to a titanium alloy shaft when brittle intermetallic phases are formed at bonding interface. Although friction welding has been used before for this application, the results have been unsatisfactory.

Instead, the disclosed process adds an additional process step and also changes the distal diameter of the shaft 17 with dramatically improved results, particularly for resolving some intermittent cracking issues along the weld interface and in the turbine that occurs when scaling up welding components. First, the titanium alloy shaft 17 is provided with a smaller diameter distal end portion 19 which is the first portion of the shaft 17 frictionally welded to the welding surface 15 of the turbine 10. The shaft is held in a rotating chuck 21 and the titanium aluminide turbine 10 is held in a stationary chuck 20. The turbine 10 may be preheated before or after placement in the stationary chuck 20. After preheating and placement in the appropriate rotating and stationary chucks 21, 20 respectively, the shaft 17 is rotated and the smaller diameter end portion 19 is pressed against the welding surface 15 using a first pressure $P_1$ and for a first time period $t_1$. After the distal end portion 19 has been fused into the welding surface 15 of the turbine 10 or otherwise ground away, the chuck 21 continues to rotate the shaft 17 as the engagement pressure is increased to $P_2$. At this point, the beveled portion 26 of the shaft 17 is being fused into the engagement surface 15 of the turbine 10 as illustrated in FIGS. 3-4. Once the beveled portion 26 has been fused into the welding surface 15, the rotating chuck 21 is stopped and the stationary shaft 17 is pressed into the turbine 10 at a greater pressure $P_3$ and for a longer time period $t_3$, which essentially provides a forging step.

What is claimed is:

1. A method for joining a first component fabricated from titanium aluminide to a second component fabricated from a titanium alloy by friction welding, the method comprising:
    preheating the first component;
    rotating the second component and pressing the second component against the first component at a first pressure and for a first time period;
    after the first time period expires, rotating the second component and pressing the second component against the first component at a second pressure for a second time period;
    after the second time period expires, stopping the rotation of the second component and pressing the second component against the first component at a third pressure for a third time period.

2. The method of claim 1 wherein the second pressure is greater than the first pressure.

3. The method of claim 1 wherein the third pressure is greater than the second pressure.

4. The method of claim 1 wherein the first time period is greater than the second time period.

5. The method of claim 1 wherein the third time period is greater than the first time period.

6. The method of claim 1 wherein the first time period and the second time period are adjusted to provide a predetermined shortening of an axial length of the shaft.

7. The method of claim 1 wherein the first component is a turbine of a turbocharger and the second component is a shaft and the first component is a turbine of the turbocharger.

8. The method of claim 1 wherein the titanium alloy is selected from the group consisting of Ti-6Al-4V, Ti-6Al-6V-2Sn, Ti-6Al-2Sn-4Zr-6Mo and combinations thereof.

9. The method of claim 1 wherein the titanium aluminide is selected from the group consisting of TiAl, $Ti_3Al$ intermetallic compound-based alloys including Ti-45Al-2Nb-2Cr, Ti-47Al-2Nb-2Cr, Ti-47Al-2W-0.5Si, Ti-47Al-2Nb-1Mn-0.5W-0.5Mo-0.2Si, Ti-48Al-2Nb-0.7Cr-0.3Si, Ti-45Al-2Mn-2Nb-0.8 vol % TiB2 and Ti-47Al-2Mn-2Nb-0.8 vol % TiB2 and combinations thereof.

10. A method of joining a shaft to a turbine of a turbocharger, the method comprising:
    providing a titanium alloy shaft having an end having first diameter and that is connected to a distal end having a second diameter that is smaller than the first diameter;

providing an titanium aluminide turbine with a welding surface for receiving the end of the shaft and having a third diameter greater than the second diameter;

preheating the turbine;

placing the shaft in a rotating chuck and placing the turbine in a stationary chuck that is axially aligned with the rotating chuck and so that the shaft is an axial alignment with the welding surface of the turbine;

rotating the shaft and pressing the distal end of the shaft against the welding surface of the turbine at a first engagement pressure;

after the distal end of the shaft is been substantially displaced or fused into the welding surface, continuing to rotate the shaft and pressing the end of the shaft against the welding surface of the turbine at a second engagement pressure;

stopping rotation of the shaft and continuing to press the end of the shaft against the welding surface of the turbine at a third engagement pressure.

11. The method of claim 10 wherein the second pressure is greater than the first pressure.

12. The method of claim 10 wherein the third pressure is greater than the second pressure.

13. The method of claim 10 wherein the first pressure is applied for a first time period and the second pressure is applied for a second time period, the first time period is greater than the second time period.

14. The method of claim 10 wherein the first pressure is applied for a first time period and the third pressure is applied for a third time period, the third time period is greater than the first time period.

15. The method of claim 10 wherein the first component is a turbine of a turbocharger.

16. A turbocharger comprising:

shaft having a first diameter at a first end thereof, the first end of the shaft being connected to a circular distal end having a second diameter that is smaller than the first diameter;

a turbine including a circular welding surface having a third diameter greater than the second diameter, the circular welding surface being frictionally welded to the circular distal end.

17. The turbocharger of claim 16 wherein the third diameter is about equal to the first diameter.

18. The turbocharger of claim 16 wherein the shaft is fabricated from a titanium alloy selected from the group consisting of Ti-6Al-4V, Ti-6Al-6V-2Sn, Ti-6Al-2Sn-4Zr-6Mo and combinations thereof.

19. The turbocharger of claim 16 wherein the turbine is fabricated from a titanium aluminide selected from the group consisting of TiAl, $Ti_3Al$ intermetallic compound-based alloys including TiAl, $Ti_3Al$ intermetallic compound-based alloys including Ti-45Al-2Nb-2Cr, Ti-47Al-2Nb-2Cr, Ti-47Al-2W-0.5Si, Ti-47Al-2Nb-1Mn-0.5W-0.5Mo-0.2Si, Ti-48Al-2Nb-0.7Cr-0.3Si, Ti-45Al-2Mn-2Nb-0.8 vol % TiB2 and Ti-47Al-2Mn-2Nb-0.8 vol % TiB2 and combinations thereof.

20. The turbocharger of claim 16 wherein the shaft is connected to the turbine by friction welding at two different pressures followed by a forging step at a third pressure.

* * * * *